United States Patent [19]
Nagaoka et al.

[11] Patent Number: 6,096,831
[45] Date of Patent: Aug. 1, 2000

[54] OLEFIN RESIN COMPOSITION AND SHEETS

[75] Inventors: Yoshinobu Nagaoka; Akihiko Egashira; Toshimitsu Hasegawa; Osamu Akaike; Asami Hirashima, all of Mie, Japan

[73] Assignee: Japan Polychem Corporation, Tokyo, Japan

[21] Appl. No.: 09/220,451

[22] Filed: Dec. 24, 1998

[30]   Foreign Application Priority Data

Dec. 25, 1997   [JP]   Japan ..................................... 9-367206
Mar. 17, 1998   [JP]   Japan ..................................... 10-087955

[51] Int. Cl.$^7$ ............................. C08L 23/00; B32B 3/26; B32B 27/08; B21B 37/00; C08J 3/34
[52] U.S. Cl. ...................... 525/240; 428/316.6; 428/323; 428/516; 524/451
[58] Field of Search ................. 525/240; 428/316.6, 428/139, 323, 56; 524/451

[56]   References Cited

U.S. PATENT DOCUMENTS

| | | | |
|---|---|---|---|
| 4,584,234 | 4/1986 | Hirose et al. | 428/323 |
| 4,587,175 | 5/1986 | Akao | 428/596 |
| 4,661,401 | 4/1987 | Akao | 428/215 |
| 4,663,218 | 5/1987 | Akao | 428/212 |
| 4,950,512 | 8/1990 | Akao | 428/212 |
| 4,978,572 | 12/1990 | Akao | 428/323 |
| 4,989,802 | 2/1991 | Akao et al. | 242/610.6 |
| 5,262,471 | 11/1993 | Akao | 524/496 |
| 5,393,603 | 2/1995 | Toyoda et al. | 428/316.6 |
| 5,414,032 | 5/1995 | Akao | 524/115 |
| 5,616,420 | 4/1997 | Yamaoka et al. | 428/515 |

FOREIGN PATENT DOCUMENTS

| | | |
|---|---|---|
| 0 714 939 | 6/1998 | European Pat. Off. . |
| 0 883 183 | 9/1998 | European Pat. Off. . |

*Primary Examiner*—David W. Wu
*Assistant Examiner*—Tanya Zalukaena
*Attorney, Agent, or Firm*—Oblon, Spivak, McClelland, Maier & Neustadt, P.C.

[57]   ABSTRACT

Disclosed is a olefin resin composition comprising a propylene resin (PP) and an ethylene resin (PE) at a PP:PE mixing ratio of 97 to 60:3 to 40 by weight, the propylene resin and the ethylene resin having such dynamic melt viscoelasticity that the PE to PP viscosity ratio, i.e., $\eta r = \eta PE/\eta PP$, is more than or equal to 0.1 and less than 1 at 1 rad/sec and more than or equal to 0.70 at 100 rad/sec and that the difference of modulus of melt elasticity between PP and PE, i.e., $\Delta G' = GPP - GPE$, is 10000 Pa or more; an olefin sheet comprising the olefin resin composition; and an olefin resin laminated sheet having a surface layer and an intermediate layer in which the intermediate layer comprises the olefin resin composition.

13 Claims, No Drawings

OLEFIN RESIN COMPOSITION AND SHEETS

FIELD OF THE INVENTION

This invention relates to an olefin resin composition for thermoforming that is excellent in thermoformability and freeze resistance. More particularly, the invention relates to an olefin resin composition and a sheet molded therefrom which can be used for production of thermoformings such as containers and covers useful as packaging materials or various industrial parts and are superior in sag resistance, rigidity, freeze resistance and heat resistance.

BACKGROUND OF THE INVENTION

An olefin resin sheet is excellent in heat resistance, oil resistance and the like and has been used for forming (vacuum forming, pressure forming, etc.) to produce formings, such as various containers, cups, and trays. However, having sharper melt properties than other resins such as polystyrene and polyvinyl chloride, an olefin resin sheet considerably sags when preheated for thermoforming, such as vacuum forming, so that the resulting formings are apt to suffer from forming defects, such as wrinkles, thickness variation, or holes.

It is known that the sag of an olefin resin sheet in thermoforming can be reduced by (1) using a polyblend of a polypropylene resin and a polyethylene resin, which is commonly practiced (see JP-A-52-136247 (the term "JP-A" as used herein means an "unexamined published Japanese patent application"), JP-A-55-108433 and JP-B-63-30951 (the term "JP-B" as used herein means an "examined Japanese patent publication")); (2) adding bismaleimide to a polyolefin (see JP-A-3-52493); (3) using a composition comprising polypropylene, an inorganic filler, and a maleic anhydride-modified or silane-modified polyolefin (see JP-A-51-69553 and JP-A-52-15542); or (4) adding fibrous polytetrafluoroethylene to a polyolefin (see JP-A-8-165358).

In recent years price competition is getting harder in, for example, the food container market, and the proportion of a recycled material in a molding material tends to increase, climbing to about 30 to 50% by weight in a polyolefin molding material. An olefin resin sheet molded from such a molding material with a width as large as about 900 mm or more is liable to sag particularly appreciably. On the other hand, process and quality requirements for containers, which are in conflict with price reduction, are getting stricter. For example, where a sheet is formed into a container with a cover tightly fitted on that is designed to improve hygiene or handling properties, it must be heated for at least double the usual time. This further increases the tendency to sag. Further, the criteria of appearance inspection has also been getting rigid, increasing rejects on account of tiny wrinkles, incorporation of foreign matter of 0.2 mm or smaller, or a slight difference in color.

Under such circumstances, addition of bismaleimide, inorganic filler and a modified polyolefin, or fibrous polytetrafluoroethylene to a polyolefin does not achieve sufficient improvement in view of the cost incurred. That is, the production loss increases due to incorporation of foreign matter during molding into sheeting or insufficient kneading, which is contradictory to the cost reduction. The technique comprising merely blending polyethylene is accompanied by such problems as stones or insufficient dispersion on account of the low melt flow rate.

With the recent increase of frozen food or fast food for microwave oven, vacuum forming containers with a cover fitted on and deep drawn vacuum forming containers which have little residual strain and retain heat resistance or freeze resistance have been widely spreading. Accordingly, it has keenly been demanded to develop a forming sheet stock which involves little production loss or is free from foreign matter incorporated during molding, which is allowed to contain an increased amount of a recycled material, and yet which can have a width as large as 1 m or more to improve the productivity in vacuum forming.

SUMMARY OF THE INVENTION

An object of the present invention is to provide a resin composition or a composite resin composition which provides, with improved productivity, a sheet for thermoforming having improved sag resistance without involving incorporation of foreign matter or production loss or without using a special material.

Another object of the present invention is to provide a sheet for thermoforming which has improved sag resistance, achieves improved productivity of formings, and provides formings excellent in rigidity, freeze resistance and heat resistance.

As a result of extensive investigations, the inventors of the present invention have found that the above objects of the invention are accomplished by an olefin resin composition or a composite olefin resin composition which comprises a propylene resin and an ethylene resin having a specific relationship in terms of dynamic melt viscoelasticity (viscosity ratio and modulus difference) at a mixing ratio within a specific range; and a sheet molded therefrom and a laminated sheet containing the sheet. The present invention has been completed based on this finding.

DETAILED DESCRIPTION OF THE INVENTION

The present invention relates to, in its first aspect, an olefin rein composition or a composite olefin resin composition (hereinafter inclusively referred to as a (composite) olefin resin composition) comprising a propylene resin (hereinafter sometimes abbreviated as PP) and an ethylene resin (hereinafter sometimes abbreviated as PE) at a PP:PE mixing ratio of 97 to 60:3 to 40 by weight %, the propylene resin and the ethylene resin having such dynamic melt viscoelasticity that the PE to PP viscosity ratio, i.e., $\eta r = \eta PE/\eta PP$, is more than or equal to 0.1 and less than 1 at 1 rad/sec and more than or equal to 0.70 at 100 rad/sec and that the difference of modulus of melt elasticity between PP and PE, i.e., $\Delta G' = GPP - GPE$, is 10000 Pa or more.

The present invention relates to, in its second aspect, an olefin resin or composite olefin resin sheet (hereinafter inclusively referred to as a (composite) olefin resin sheet) which comprises the (composite) olefin resin composition.

The present invention relates to, in its third aspect, an olefin resin or composite olefin resin laminated sheet (hereinafter inclusively referred to as a (composite) olefin resin laminated sheet) having a surface layer and an intermediate layer, in which the intermediate layer is the above-described (composite) olefin resin sheet.

1. Olefin Resin Composition

The olefin resin composition which can be used in the invention comprises a propylene resin and an ethylene resin at a mixing ratio of 97 to 60:3 to 40 by weight %. The ratio of the viscosity, in terms of dynamic melt viscoelasticity, of PE to that of PP, i.e., $\eta r = \eta PE/\eta PP$, is more than or equal to 0.1 and less than 1 at 1 rad/sec and more than or equal to 0.70 at 100 rad/sec, and the difference of modulus of melt elasticity between PP and PE, i.e., ΔG'=GPP−GPE, is more than and equal to 10000 Pa.

If the viscosity ratio ηr is less than 0.1 or not less than 1 at 1 rad/sec, or if the modulus difference ΔG' is less than 10000 Pa at 1 rad/sec, the resin composition has too low or too high a viscosity to form desired ethylene resin domains in the resulting sheet that bring about improvement in sag resistance. If the viscosity ratio ηr at 100 rad/sec is less than 0.70, the ethylene resin in the vicinity of the surface of the resulting sheet is stretched. It follows that the ethylene resin shrinks in preference to the propylene resin when heated, easily developing holes in the thermoformings.

As far as the olefin resins satisfy the above-specified relationship in terms of dynamic viscoelasticity, the ethylene resin is apt to concentrate in the central portion in the thickness direction of the sheet, hardly being orientated in the vicinity of the sheet surface, and the ethylene resin domains take an orientated and dispersed form with a large surface area in the machine direction or the transverse direction of the sheet as is observed from the X-ray transmission or the SEM photograph. Such an ethylene resin domain form brings about an improvement in sag resistance.

The ethylene resin and propylene resin which can be used in the present invention are not particularly limited as long as the above-mentioned relationship of dynamic melt viscoelasticity is fulfilled.

The propylene resin includes (1) a propylene homopolymer and (2) a random or block copolymer comprising 97% by weight or more of propylene and other α-olefin having 2 to 20 carbon atoms, preferably 2 to 12 carbon atoms, still preferably 2 to 8 carbon atoms, (3) a mixture of the propylene resins (1) and (2) described above, and (4) a mixture of an ethylene resin and any one of the propylene resins (1) to (3) described above. The α-olefin as referred to above includes ethylene, butene-1, pentene-1, hexene-1, and 4-methyl-pentene-1.

The propylene resin preferably has a melt flow rate (hereinafter abbreviated as MFR) of 0.3 to 20 g/10 min, particularly 0.3 to 10 g/10 min, as measured in accordance with JIS-K7210 (230° C., 2.16 kg load). If the MFR is less than 0.3 g/10 min, it tends to be difficult to mold the resin composition into sheeting because a high resin pressure is required. If the MFR exceeds 20 g/10 min, surging tends to occur in sheet molding to lessen the effect in improving sag resistance.

While not limiting, the density of the propylene resin is preferably 0.890 to 0.920 g/cm$^3$, as measured in accordance with JIS-K7112 (23° C.) from the standpoint of gloss and impact resistance.

The ethylene resin which can be used in the invention includes an ethylene homopolymer or an ethylene copolymer comprising at least 50% by weight of ethylene and at least one α-olefin having 3 to 20 carbon atoms, preferably 3 to 12 carbon atoms, still preferably 3 to 8 carbon atoms. These ethylene resins are prepared by high pressure ionic polymerization, vapor phase polymerization or solution polymerization in the presence of a Ziegler catalyst, a metallocene catalyst, etc. From the viewpoint of rigidity, freeze resistance and heat resistance, an ethylene homopolymer and an ethylene-α-olefin copolymer having an ethylene content of 70% by weight or more are preferred.

The ethylene resin preferably has an MFR (measured in accordance with JIS-K7210, condition 4) of 0.5 to 10 g/10 min, particularly 0.5 to 5.0 g/10 min. Ethylene resins having too high or too low an MFR, i.e., too low or too high a melt viscosity tend to have poor compatibility with a propylene resin. Such an ethylene resin tends to fail to form the above-mentioned desired domains that improve sag resistance or tends to disturb the flow balance which can cause surging or surface roughening of the sheet, resulting in forming defects.

From the viewpoint of gloss and impact resistance, it is desirable for the ethylene resin, while not limiting, to have a density of 0.88 to 0.970 g/cm$^3$, particularly 0.94 g/cm$^3$ or lower.

The PP:PE mixing ratio in the olefin resin composition is 97 to 60:3 to 40, preferably 95 to 60:5 to 40, by weight %. Where PE exceeds 40% by weight, i.e., where PP is less than 60% by weight, the dispersion and orientation state of the ethylene resin in the sheet is reduced, or the resulting formings undergo an appreciable dimensional change or have poor rigidity and poor heat resistance. If PP exceeds 91% by weight, i.e., if PE is less than 3% by weight, the amount of dispersed PE in the composition is too small to produce the desired improvement in sag resistance. In this case, the permissible maximum proportion of a recycled material in the molding material should be lowered, the sheet width practical for forming is limited, or the resulting formings have poor freeze resistance.

The olefin resin composition of the invention is prepared by compounding the propylene resin and the ethylene resin in a known kneading method, for example, by means of a kneading machine such as an extruder, a Banbury mixer, a roll, a Brabender. While the resins are usually compounded in an extruder, etc. into pellets for molding into sheeting, they can be once dry blended in a supermixer, a tumbling mixer, etc. into a mixed powder, which is then put in a hopper of an extruder to obtain a sheet.

If desired, the olefin resin composition can contain additives customarily added to a molding material, such as antioxidants, ultraviolet absorbers, antistaticagents, lubricants, dispersants, nucleating agents, coloring agents, corrosion inhibitors, blowing agents, and the like, or these additives may be applied to the resulting sheet.

2. Composite Olefin Resin Composition

An inorganic filler can be added to the above-described olefin resin composition to make a composite olefin resin composition. The inorganic filler is preferably non-fibrous powder. Suitable inorganic fillers include calcium carbonate, magnesium carbonate, talc, clay, mica, titanium oxide, barium sulfate, calcium sulfate, titanium dioxide, carbon black, aluminum hydroxide, aluminum oxide, magnesium hydroxide, and silica. While not limiting, the particle size of the inorganic filler is preferably 0.1 to 50 μm. The inorganic fillers can be used either individually or as a mixture of two or more thereof. Particularly preferred of the inorganic fillers is talc powder having a particle size of not greater than 20 μm.

The inorganic filler is added in an amount of 200 parts by weight or less, preferably 100 parts by weight or less, per 100 parts by weight of the olefin resin composition. If the amount of the inorganic filler exceeds 200 parts, the inorganic filler is poorly dispersible in the resin composition, the extrudability of the composite material tends to reduce, and the resulting formings, such as containers, are inferior in appearance, freeze resistance and impact resistance.

The composite olefin resin composition preferably has an MFR of 20 g/10 min or less, particularly preferably 10 g/10 min or less, as measured in accordance with JIS-K7210 (230° C., 2.16 kg load). Where the MFS is higher than 20 g/10 min, the composition tends to exhibit poor moldability into sheeting, and the resulting sheet tends to have poor formability into a container. With regard to the lower limit of the MFR, there is practically no limit, and even a composition having substantially no flowability at the time of MFR measurement can be used as long as it is moldable into sheeting by means of a molding machine. However, a preferred lower limit of the MFR is 0.01 g/10 min. If the MFR is lower than this limit, the throughput reduces, and the load on the motor increases to diminish productivity in extrusion.

The composite olefin resin composition preferably has a density of 1.64 g/cm$^3$ or lower, particularly 1.45 g/cm$^3$ or lower, as measured in accordance with JIS-K7112 (23° C.) Where the density is higher than 1.64 g/cm$^3$, the composition has reduced flowability to require a high resin pressure, and the resulting formings tend to have poor appearance or insufficient freeze resistance.

The composite olefin resin composition can be prepared by (1) directly compounding the olefin resin composition with the inorganic filler, (2) preparing a high concentrate master batch from the olefin resin composition and the inorganic filler and compounding the olefin resin composition with the master batch, or a like technique.

The compounding can be carried out by mixing in, for example, a gelation mixer, a supermixer, etc. and melt-kneading the mixture by means of a mixing apparatus, such as an extruder, a kneader, a calender roll, or a combination thereof, to obtain pellets of a composite olefin resin composition. The molten mixture may be extruded directly into a sheet.

3. (Composite) Olefin Resin Sheet

The (composite) olefin resin sheet according to the present invention comprises the above-described (composite) olefin resin composition. The sheet can be produced by means of a polishing mirror roll, an air knife (inclusive of a pressure roll) or a metallic mirror belt (a single or twin belt), or by T-die extrusion (the extruded film is chilled and then pressed with a metallic mirror belt), inflation or calendering.

The thickness of the (composite) olefin resin sheet is not particularly limited and can be decided according to the end use. It usually ranges from 0.10 to 3 mm and preferably, for particular use as food containers, 0.15 to 2.0 mm.

The (composite) olefin resin sheet comprising the specific resin composition according to the present invention shows a reduced sag on heating. As a result, the maximum sheet width practical for forming, such as vacuum forming or pressure forming, increases over the conventional forming sheet stocks. Further the forming productivity rises at practically the same material cost as the conventional sheet stocks. Furthermore the (composite) olefin resin composition of the invention is advantageous in using a recycled olefin resin material as part of the molding material.

4. Olefin Resin Laminated Sheet

The olefin resin laminated sheet according to the present invention has a surface layer comprising an olefin resin material and an intermediate layer comprising the olefin resin composition of the invention.

(1) Surface Layer

The olefin resin material constituting the surface layer (hereinafter referred to as the olefin resin material for the surface layer) are not particularly limited and can be selected from those used in the above-described (composite) olefin resin sheet for forming, such as ethylene resins and propylene resins.

Useful propylene resins for the olefin resin material for the surface layer include a propylene homopolymer, a random or block copolymer comprising 97% by weight or more of propylene and ethylene or other α-olefin such as butene-1, pentene-1, hexene-1 or 4-methyl-pentene-1, a mixture of such propylene resins, and a mixture of such propylene resins and not more than 40% by weight of an ethylene resin (inclusive of an ethylene homopolymer and an ethylene copolymer comprising at least 50% by weight of ethylene and an α-olefin having 3 to 20 carbon atoms, preferably 3 to 12 carbon atoms, still preferably 3 to 8 carbon atoms).

The ethylene resin used for the olefin resin material for the surface layer is preferably prepared by high pressure ionic polymerization, vapor phase polymerization or solution polymerization in the presence of a Ziegler catalyst, a metallocene catalyst, etc. The ethylene resin preferably has an MFR (measured in accordance with JIS-K7210, condition 4) of 0.5 to 10 g/10 min, particularly 0.5 to 5 g/10 min. Ethylene resins having too high or too low an MFR, i.e., too low or too high a melt viscosity tend to have poor compatibility with a propylene resin or tend to disturb the flow balance between the surface layer and the intermediate layer. Disturbance in the flow balance can cause surging or surface roughening of the sheet, resulting in poor formability into containers.

From the viewpoint of rigidity, freeze resistance and heat resistance, a propylene homopolymer or a resin mixture of a propylene homopolymer and an ethylene-α-olefin copolymer having an ethylene content of 70% by weight or more is preferred as the olefin resin material for the surface layer.

If desired, the olefin resin material for the surface layer can contain additives customarily added to a molding material, such as antioxidants, ultraviolet absorbers antistatic agents, lubricants, dispersants, nucleating agents, coloring agents, corrosion inhibitors, blowing agents, and the like, or these additives may be applied to the resulting sheet.

The olefin resin material for the surface layer has an MFR of 0.3 to 20 g/10 min, preferably 0.5 to 10 g/10 min, still preferably 1.0 to 10 g/10 min, as measured in accordance with JIS-K7210 (230° C., 2.16 kg load). If the MFR exceeds 20 g/10 min, the surface layer has a thickness distribution. If it is less than 0.3 g/10 min, surface roughness can result in preparing a laminated sheet, which may lead to thickness variation or poor appearance of formings.

The olefin resin material for the surface layer has a density of 0.890 to 0.920 g/cm$^3$, preferably 0.900 to 0.920 g/cm$^3$ measured in accordance with JIS-K7112 (23° C.). If the density is less than 0.890 g/cm$^3$, the rigidity is insufficient. If it is more than 0.920 g/cm$^3$, the contact with chill rolls is insufficient, which can result in thickness variation.

(2) Thickness of Olefin Resin Laminated Sheet

In the laminated sheet having at least the surface layer comprising the olefin resin and the intermediate layer comprising the olefin resin composition, the ratio of the thickness of the surface layer is preferably 1% or more, particularly 3 to 80%, based on the thickness of the laminated sheet. If the thickness of the surface sheet is less than 1%, not only is produced little effect in improving sag resistance but the processing temperature latitude in vacuum forming is narrow, tending to cause forming defects.

5. Composite Olefin Resin Laminated Sheet

The composite olefin resin laminated sheet according to the present invention has a surface layer and an intermediate layer and contains a sheet comprising the specific (composite) olefin resin composition of the invention, the olefin resin material used as a surface layer of the olefin resin laminated sheet, or an olefin resin composite material, wherein the intermediate layer comprises the (composite) olefin resin composition of the invention, and at least one of the surface layer and the intermediate layer comprises the composite olefin resin composition according to the invention or an olefin resin composite material. The term "olefin resin composite material" as used herein denotes a composition comprising the above-described olefin resin material and not more than 200% by weight of an inorganic filler.

The olefin resin composite material preferably has an MFR of 20 g/10 min or lower, still preferably 10 g/10 min or lower, as measured in accordance with JIS-K7210 (230° C., 2.16 kg load). Olefin resin composite materials whose MFR exceeds 20 g/10 min have an excessive melt viscosity, tending to disturb the flow balance between the surface layer and the intermediate layer, which can result in surging of the sheet to cause forming defects.

The olefin resin composite material preferably has a density has a density of 1.65 g/cm$^3$ or lower, still preferably 1.45 g/cm$^3$ or lower, as measured in accordance with JIS-K7112 (23° C.). If the density is higher than 1.65 g/cm$^3$, the flowability of the composite material reduces, and a high resin pressure is required, making sheeting difficult, or the resulting laminated sheet tends to have poor formability into containers.

The composite olefin resin laminated sheet of the invention can have (1) a structure comprising a surface layer comprising the olefin resin composition and the intermediate layer comprising the composite olefin resin composition, (2) a structure comprising a surface layer comprising the composite olefin resin composition and an intermediate layer comprising the olefin resin composition, (3) a structure comprising a surface layer comprising the olefin resin material and an intermediate layer comprising the composite olefin resin composition, or (4) a structure comprising a surface layer comprising the olefin resin composite material and an intermediate layer comprising the composite olefin resin composition.

The thickness of the composite olefin resin laminated sheet is not particularly limited and is appropriately decided depending on the use. It is usually 0.10 to 3.0 mm and preferably, for particular use as food containers, 0.15 to 2.0 mm. The thickness ratio of the constituent layers is not limited either. With the thickness ratio of the surface layer being 1% or more, preferably 3% or more, to the total thickness of the laminated sheet, the sag resistance of the laminated sheet can be improved, and formings excellent in rigidity and freeze resistance can be obtained. A preferred thickness ratio of surface layer to intermediate layer is 1 to 80:99 to 20, particularly 5 to 70:95 to 30.

6. Layer Structure of Laminated Sheet

The layer structure of the laminated sheet according to the present invention is not particularly restricted as far as it has the above-described surface layer and an intermediate layer made of the (composite) olefin resin composition. Conceivable layer structures include a surface layer/intermediate layer/surface layer structure, a skin layer/surface layer/intermediate layer/surface layer/skin layer structure, and a skin layer/surface layer/intermediate layer/base layer structures The laminated sheet may have two or more surface layers and/or intermediate layers with a different layer interposed therebetween. For example, the laminated sheet can have additional functional layers according to the end use, such as an adhesive layer, a gas barrier layer, a foamed layer, a recycled material layer, and a layer for impact resistance or for prevention of extruded residue.

7. Lamination

The method for producing the laminated sheet of the invention is not particularly limited. For example, the laminated sheet is produced by single layer lamination or coextrusion. Single layer lamination can be carried out by means of a polishing mirror roll, an air knife (inclusive of a pressure roll) or a metallic mirror belt (a single or twin belt), or by T-die extrusion (the extruded film is chilled and then pressed with a metallic mirror belt), inflation or calendering. The (composite) olefin resin laminated sheet of the invention is also obtained by adhering a surface layer on a sheet prepared by the above-described single layer lamination by fusion bonding or with an adhesive. Coextrusion is preferred for productivity and ease of altering the layer structure.

8. Use of Laminated Sheet

The (composite) olefin resin laminated sheet according to the present invention is suited as a sheet for thermoforming. The terminology "thermoforming" generically denotes vacuum forming comprising applying a heat-softened plastic sheet onto a desired mold and evacuating air from between the mold and the sheet and pressure forming using compressed air having a pressure above atmospheric pressure, if desired combined with vacuum. More specifically, such thermoforming includes indirect heating thermoforming (vacuum forming, pressure forming, solid state pressure forming), solid state pressing, stamping, and combinations thereof. Formings obtainable by these forming techniques include various containers and covers thereof used in food packaging.

The present invention will now be illustrated in greater detail with reference to Examples. In Examples, measurement and evaluation were made as follows.

(1) Dynamic Viscoelasticity

Measurement was made with the following instrument under the following conditions.

Instrument: Mechanical Spectrometer RMS800, manufactured by Rheometrics Co.
Temperature: 200° C.
Fixture: Parallel plates of 25 mm in diameter
Measuring Mode: Frequency sweep
Gap: 1.5 mm
Frequency: 0.01 to 100 rad/sec
The modulus of melt elasticity was measured at 1 rad/sec.
Strain: 10%

(2) Moldability into Sheet

Evaluated from sheet appearance, roll release properties, thickness variation, and the like on the following standards.

A . . . The sheet is neat with no thickness variation nor surface roughness.

B . . . The sheet has poor roll release properties, tending to suffer from uneven gloss or thickness variation.

C . . . The sheet is defective due to considerable thickness variation or surface roughness.

(3) Flexural Modulus

Measured in accordance with JIS-K7203.

(4) Du Pont Impact Strength

Measured in accordance with ASTM-D2794.

(5) Sag Resistance

A sheet (resin sheet, resin laminated sheet, composite resin sheet or composite resin laminated sheet) was clamped between a pair of iron frames (33 mm×33 mm×2 mm) having a 30 cm-square hole in the center and set horizontally in a heat insulating box. Upper and lower heaters set at 450° C. were slid above and below the sheet each 15 cm apart from the sheet to heat the sheet uniformly from both sides. The heated sheet once sagged below the frame but, as the sheet temperature rose uniformly in the thickness direction, it became horizontal. As the heating was continued further, the sheet sagged down by its own weight. A beam of a laser set below the lower heater was aimed at the sheet to measure the sag for every second. The sag and the surface temperature of the sheet when heated for 35 seconds and the sag gradient (a sag occurring in 1-second heating) were obtained.

(6) Formability into Container
(6-1) Sag Resistance

The sheet was set on a vacuum forming machine manufactured by Asano Kenkyusho (FLS 415) and heated at the lower heater temperature of 350° C. and the upper heater temperature of 530° C. for 50 seconds, and the sag of the sheet was measured with a scale.

(6-2) Appearance

The appearance of 35 containers for each sheet sample was observed with the naked eye and rated as follows.

A . . . All the containers are satisfactory in shape with no thickness variation.

B . . . Part of the containers suffer from wrinkles or thickness variation.

C . . . Many of the containers suffer from wrinkles or holes due to considerable thickness variation.

(7) Freeze Resistance of Container

A container obtained by vacuum forming was filled with 250 g of rice and packaged in stretch wrap film (Yuka Wrap). After left to stand at −20° C. for 24 hours, the packaged container was dropped from a height of 1 m 10 times with its bottom down, and the change in appearance was rated as follows.

A . . . No cracks or breaks developed at all.

B . . . Cracks or breaks developed in parts after 4 to 9 drops.

C . . . Cracks or breaks developed after 1 to 3 drops.

The particulars of the propylene resin (PP) and ethylene resin (PE) used in Examples are tabled below.

TABLE 1

| | MFR (g/10 min) | Density (g/cm$^3$) | M.P. (° C.) | Trade Name (Manufacturer) |
|---|---|---|---|---|
| HPP-1 | 0.5 | 0.905 | 171 | Novatec PP EA9 (Nippon Polychem) |
| HPP-2 | 11 | 0.905 | 170 | Novatec PP MA3 (Nippon Polychem) |
| BPP-1 | 0.5 | 0.905 | 168 | Novatec PP EC9 (Nippon Polychem) |
| HPE-1 | 21 | 0.945 | 130 | Novatec HD HJ290 (Nippon Polychem) |
| HPE-2 | 0.05 | 0.947 | 133 | Novatec HD HB210R (Nippon Polychem) |
| LPE-1 | 0.3 | 0.923 | 111 | Novatec LD LF122 (Nippon Polychem) |
| LLPE-1 | 2.2 | 0.898 | 90 | EXACT 4051 (Exxon Chemical) |
| LLPE-2 | 2.0 | 0.920 | 126 | Novatec LL SF240 (Nippon Polychem) |
| LLPE-3 | 1.7 | 0.928 | 128 | Novatec LL MHL7011 (Nippon Polychem) |
| LLFE-4 | 16 | 0.898 | 91 | EXACT 4044 (Exxon Chemical) |

EXAMPLE 1

A propylene homopolymer (HPP-1) and an ethylene polymer (LLPE-1) were melt kneaded at a weight ratio of 75:25 in a single screw extruder (bore: 60 mm) at 200° C. and pelletized to obtain pellets of an olefin resin composition having an MFR of 0.9 g/10 min and a density of 0.901 g/cm$^3$.

The pellets were fed to an extruder (bore: 40 mm) and melt extruded at a resin temperature of 240° C. through a T-die to obtain a 400 mm wide molten sheet. The molten sheet was passed through chill rolls for polishing set at an upper roll temperature of 50° C., a middle roll temperature of 80° C., and a lower roll temperature of 50° C. to obtain an olefin resin sheet having a thickness of 0.5 mm and a width of 350 mm. The moldability of the pellets into sheeting and the physical properties of the resulting sheet were evaluated as described above. The results obtained are shown in Table 3 below. A sheet showing a smaller sag and a smaller sag gradient on 35-second heating (450° C.) can be seen as excellent in sag resistance.

EXAMPLES 2, 3 AND 6 AND COMPARATIVE EXAMPLES 1 TO 5 AND 8

Olefin resin sheets were prepared in the same manner as in Example 1, except for changing the kinds and mixing ratio of the olefin resins as shown in Table 2 below. The moldability and the physical properties of the resulting sheets are shown in Table 3.

EXAMPLE 4

A hundred parts by weight of a mixed resin consisting of 71.4% by weight of propylene homopolymer (HPP-1) and 28.6% by weight of an ethylene polymer (LLPE-1) and 30 parts by weight of talc (particle size: 10 μm, produced by Fuji Talc K.K.) were melt-kneaded in a gelation mixer at 170° C., and the mixture was extruded from a single screw extruder (bore: 60 mm) at 230° C. and pelletized to obtain pellets of a composite olefin resin composition having an MFR of 0.8 g/10 min and a density of 1.13 g/cm$^3$. The pellets were fed to an extruder (bore: 40 mm) and extruded at a resin temperature of 240° C. through a T-die to obtain a 400 mm wide composite olefin resin sheet in a molten state.

The molten sheet was passed through chill rolls for polishing set at an upper roll temperature of 60° C., a middle roll temperature of 80° C., and a lower roll temperature of 60° C. to obtain a composite olefin resin sheet having a thickness of 0.5 mm and a width of 350 mm. The moldability and the physical properties of the resulting sheet were evaluated in the same manner as in Example 1. The results obtained are shown in Table 3.

EXAMPLE 5 AND COMPARATIVE EXAMPLES 6 TO 7

Composite resin sheets were prepared in the same manner as in Example 4, except for changing the composite resin composition as shown in Table 2. The moldability and the physical properties of the resulting sheets were evaluated in the same manner as in Example 1. The results obtained are shown in Table 3.

TABLE 2

(Composite) Olefin Resin Composition

| | Olefin Resin | | Viscosity Ratio η r | | Modulus Difference | Filler |
|---|---|---|---|---|---|---|
| | PP (wt %) | PE (wt %) | 1 rad/sec | 100 rad/sec | Δ '(Pa) | (part*) |
| Example | | | | | | |
| 1 | HPP-1 (75) | LLPE-1 (25) | 0.4 | 1.5 | 21000 | — |
| 2 | HPP-1 (93) | LLPE-2 (7) | 0.3 | 0.75 | 19000 | — |
| 3 | HPP-1 (65) | LLPE-3 (35) | 0.6 | 1.3 | 20000 | — |
| 4 | HPP-1 (71.4) | LLPE-1 (28.6) | 0.4 | 1.5 | 21000 | talc (45) |
| | 100 parts by wt. | | | | | |
| 5 | HPP-1 (87.5) | LLPE-2 (12.5) | 0.6 | 1.3 | 19000 | talc (12) |
| | 100 parts by wt. | | | | | |
| 6 | BPP-1 (85) | LLPE-1 (15) | 0.5 | 1.0 | 20000 | — |
| Compara. Example | | | | | | |
| 1 | HPP-1 (75) | HPE-1 (25) | 0.03 | 0.2 | 22500 | — |
| 2 | HPP-1 (75) | LPE-1 (25) | 0.7 | 0.7 | 6000 | — |
| 3 | HPP-2 (75) | HPE-2 (25) | 2.3 | 1.6 | 17000 | — |
| 4 | HPP-1 (75) | LLPE-4 (25) | 0.03 | 0.3 | 23000 | — |
| 5 | HPP-1 (40) | LLPE-1 (60) | 0.4 | 1.5 | 21000 | — |
| 6 | HPP-1 (66.7) | LLPE-1 (33.3) | 0.4 | 1.5 | 21000 | talc (250) |
| | 100 parts by wt. | | | | | |
| 7 | HPP-1 (71.4) | HPE-1 (28.6) | 0.03 | 0.2 | 22500 | talc (45) |
| | 100 parts by wt. | | | | | |
| 8 | HPP-1 (100) | — | — | — | 24500 | — |

*Per 100 parts by weight of the total amount of PP and PE

TABLE 3

Results of Evaluation

| | Thickness (mm) | Appearance (Moldability) | Flexural Modulus (MPa) | Du Pont Impact Value (J) | Sag Resistance (both side heating at 450° C.) | | |
|---|---|---|---|---|---|---|---|
| | | | | | Surface Temp. (° C.) | Sag (mm) | Sag Gradient (sag/sec) |
| Example | | | | | | | |
| 1 | 0.5 | A | 1000 | > 3.1 | 275 | 15 | 1.6 |
| 2 | 0.5 | A | 1100 | 2.5 | 278 | 18 | 1.9 |
| 3 | 0.5 | A | 870 | > 3.1 | 273 | 10 | 1.1 |
| 4 | 0.5 | A | 3000 | > 3.1 | 295 | 16 | 1.7 |
| 5 | 0.5 | A | 1800 | > 3.1 | 288 | 14 | 1.4 |
| 6 | 0.5 | A | 950 | > 3.1 | 270 | 12 | 1.1 |
| Compara. Example | | | | | | | |
| 1 | 0.5 | A | 1090 | 1.8 | 273 | 48 | 8.0 |
| 2 | 0.5 | A | 980 | 1.0 | 270 | 40 | 5.0 |
| 3 | 0.5 | A | 1100 | 1.1 | unmeasurable due to hole development within 30 sec. | | |
| 4 | 0.5 | A | 650 | > 3.1 | 276 | 58 | 10 |
| 5 | 0.5 | B | 650 | > 3.1 | 263 | > 100 | > 20 |
| 6 | 0.5 | C | 5800 | < 0.5 | unmeasurable due to hole development within 30 sec. | | |
| | surface roughness developed due to poor roll release | | | | | | |
| 7 | 0.5 | A | 3100 | 0.8 | 290 | > 60 | > 15 |
| 8 | 0.5 | A | 1200 | 1.3 | 272 | 45 | 3.9 |

EXAMPLE 7

A propylene homopolymer (HPP-1) was fed to an extruder (bore: 40 mm), and to another extruder (bore: 90 mm) were fed the pellets of the olefin resin composition prepared in Example 1. The two resin materials were melt coextruded at a resin temperature of 240° C. through a feed block die for 2 kinds and 3 layers and a T-die to obtain a 1100 mm wide molten laminated sheet having a three-layered structure of PP/olefin resin composition/PP.

The molten laminated sheet was passed through chill rolls for polishing set at an upper roll temperature of 60° C., a middle roll temperature of 80° C., and a lower roll temperature of 60° C. to obtain an olefin resin laminated sheet composed of 2 kinds and 3 layers having a thickness of 0.5 mm (30/440/30 μm) and a width of 1040 mm.

The resulting laminated sheet was thermoformed into a container of 18 cm in length, 25 cm in width and 3 cm in depth on a vacuum forming machine (FLS 415 manufactured by Asano Kenkyusho) at a lower heater temperature of 350° C. and an upper heater temperature of 530° C. in a cycle of 5.0 seconds. Thirty-five containers were prepared.

The formability of the resulting composite sheet (sag resistance of the sheet in vacuum forming and appearance of vacuum forming containers obtained therefrom) and freeze resistance of the vacuum forming containers were evaluated as described above. The results obtained are shown in Table 6 below.

EXAMPLES 8 TO 11 AND COMPARATIVE EXAMPLES 9 TO 13

(Composite) olefin resin laminated sheets and vacuum forming containers were prepared in the same manner as in Example 7, except for changing the composition of the molding material and the thickness of the constituent layers as shown in Tables 4 and 5 below. The resulting sheets and containers were evaluated in the same manner as in Example 7. The results obtained are shown in the Table 6.

The recycled material used in the intermediate layer was prepared by grinding the corresponding resin sheet, and pelletizing the grinds in a pelletizer at a resin temperature of 230° C. The pellets thus prepared were dry blended with the pellets of the (composite) olefin resin composition for the intermediate layer.

TABLE 4

| | Surface Layer (Composite) Olefin Resin Composition | | | | | | | Intermediate Layer (Composite) Olefin Resin Composition | | | | | | | |
|---|---|---|---|---|---|---|---|---|---|---|---|---|---|---|---|
| | | | Viscosity Ratio ηr | | | | | | | Viscosity Ratio ηr | | | | | |
| Example | PP (wt %) | PE (wt %) | 1 rad/s | 100 rad/s | Filler (part*) | Thickness (mm) | Modulus Difference ΔG' (Pa) | PP (wt %) | PE (wt %) | 1 rad/s | 100 rad/s | Modulus Difference ΔG' (Pa) | Filler (part*) | Recycled Material (wt %**) | Thickness (mm) |
| 7 | HPP-1 (100) | — | 0 | 0 | — | 0.03 | 24500 | HPP-1 (75) | LLPE-1 (25) | 0.4 | 1.5 | 21000 | — | — | 0.44 |
| 8 | HPP-1 (75) | LLPE-1 (25) | 0.4 | 1.5 | — | 0.03 | 21000 | HPP-1 (75) | LLPE-1 (25) | 0.4 | 1.5 | 21000 | talc (45) | recycled composite olefin resin (30) | 0.44 |
| 9 | HPP-1 (75) | LLPE-1 (25) | 0.4 | 1.5 | talc (45) | 0.05 | 21000 | HPP-1 (75) 100 parts by wt. | LLPE-3 (25) 70 wt % | 0.6 | 1.3 | 20000 | — | recycled olefin resin (30) | 0.40 |
| 10 | HPP-1 (75) 100 parts by wt. | LLPE-1 (25) | 0.4 | 1.5 | talc (45) | 0.03 | 21000 | HPP-1 (75) 100 parts by wt. | LLPE-3 (25) 70 wt % | 0.6 | 1.3 | 20000 | talc (45) | recycled composite olefin resin (30) | 0.44 |
| 11 | HPP-1 (100) 100 parts by wt. | — | — | — | talc (45) | 0.03 | 24500 | HPP-1 (93) 100 parts by wt. | LLPE-3 (7) 70 wt % | 0.3 | 0.75 | 19000 | talc (45) | recycled olefin resin (30) | 0.44 |

Note:
*Per 100 parts by weight of the total amount of PP and PE.
**Based on the total molding material for the intermediate layer.

TABLE 5

| | Surface Layer (Composite) Olefin Resin Composition | | | | | | | Intermediate Layer (Composite) Olefin Resin Composition | | | | | | | |
|---|---|---|---|---|---|---|---|---|---|---|---|---|---|---|---|
| | | | Viscosity Ratio ηr | | | | | | | Viscosity Ratio ηr | | | | | |
| Example | PP (wt %) | PE (wt %) | 1 rad/s | 100 rad/s | Modulus Difference ΔG' (Pa) | Filler (part*) | Thickness (mm) | PP (wt %) | PE (wt %) | 1 rad/s | 100 rad/s | Modulus Difference ΔG' (Pa) | Filler (part*) | Recycled Material (wt %***) | Thickness (mm) |
| 9 | HPP-1 (100) | — | — | — | 24500 | — | 0.03 | HPP-1 (75) | LLPE-1 (25) | 0.03 | 0.2 | 22500 | — | recycled olefin resin (30) | 0.44 |
| 10 | HPP-1 (100) | — | — | — | 24500 | — | 0.03 | HPP-1 (75) | HPE-1 (25) | 0.03 100 parts by wt. | 0.2 70 wt % | 22500 | talc (45) | recycled composite olefin resin (30) | 0.44 |
| 11 | HPP-1 (100) | — | — 100 parts by wt. | — | 24500 | talc (45) | 0.05 | HPP-1 (100) | — | — 100 parts by wt. | — 70 wt % | 24500 | talc (45) | recycled composite olefin resin (30) | 0.40 |
| 12 | HPP-1 (75) | LLPE-1 (25) | 0.03 100 parts by wt. | 0.2 | 22500 | talc (45) | 0.05 | HPP-1 (75) | HPE-1 (25) | 0.03 100 parts by wt. | 0.2 70 wt % | 22500 | talc (45) | recycled composite olefin resin (30) | 0.40 |
| 13 | HPP-1 (100) | — | — | — | 24500 | talc (45) | 0.05 | HPP-1 (75) | LLPE-4 (25) | 0.03 | 0.3 70 wt % | 23000 | — | recycled olefin resin (30) | 0.40 |

Note:
*Per 100 parts by weight of the total amount of PP and PE.
**Based on the total molding material for the intermediate layer.

TABLE 5

Formability of Sheet and Freeze Resistance of Formings

|  | Sag (mm) | Appearance | Freeze Resistance |
|---|---|---|---|
| Example |  |  |  |
| 7 | 80 | A | A |
| 8 | 90 | A | A |
| 9 | 75 | A | A |
| 10 | 95 | A | A |
| 11 | 95 | A | A |
| Compara. Example |  |  |  |
| 9 | 170 | B–C | B |
| 10 | 200 | C | B |
| 11 | 160 | B–C | B |
| 12 | 220 | C | B |
| 13 | 240 | C | B |

Effect of the Invention:

The olefin resin sheet according to the invention, which comprises a propylene resin and an ethylene resin having a specific viscosity ratio and a specific modulus difference at a specific mixing ratio, can be produced at good molding productivity. The sheet exhibits markedly improved sag resistance in thermoforming to provide thermoformings such as containers with little thickness variation even if a recycled material is used as a part of the molding material in an increased proportion. Widening of the sheet is not accompanied by considerable increase of sag, which makes it feasible to carry out thermoforming using a wide sheet, leading to improved productivity in thermoforming. In addition, the formings obtained from the sheet are excellent in rigidity, freeze resistance and heat resistance for the material cost.

What is claimed is:

1. An olefin resin composition comprising, 97 to 60 percent by weight of a propylene resin (PP), 3 to 40 percent by weight of an ethylene resin (PE); and 0 to 200 parts by weight of an inorganic filler, wherein the propylene resin has a MFR of 0.3 to 10 g/10 min; and wherein the propylene resin and the ethylene resin have such storage elastic modulus according to dynamic melt viscoelasticity measurement that the PE to PP viscosity ratio, $\eta r = \eta PE/\eta PP$, is more than or equal to 0.1 and less than 1 at 1 rad/sec and more than or equal to 0.70 at 100 rad/sec, and that the difference of modulus of melt elasticity between PP and PE, expressed as: $\Delta G' = G'_{PP} - G'_{PE}$ is 10000 Pa or more.

2. The olefin resin composition according to claim 1, wherein the propylene resin has a melt flow rate of 0.3 to 20 g/10 min and a density of 0.890 to 0.920 g/cm$^3$, and the ethylene resin has a melt flow rate of 0.5 to 10 g/10 min and a density of 0.880 to 0.970 g/cm$^3$.

3. The olefin resin composition according to claim 2, wherein the inorganic filler has a particle size of 0.1 to 50 μm.

4. The olefin resin composition according to claim 2, wherein the inorganic filler is talc having a particle size of 0.1 to 20 μm.

5. A sheet comprising the olefin resin composition according to claim 1.

6. The sheet according to claim 5, which is a sheet for thermoforming.

7. A laminated sheet comprising a surface layer comprising an olefin resin material having a melt flow rate of 0.3 to 20 g/10 min and a density of 0.890 to 0.920 g/cm$^3$, and an intermediate layer comprising the olefin resin composition according to claim 1.

8. A laminated sheet comprising a surface layer comprising an olefin resin material having a melt flow rate of 0.3 to 20 g/10 min and a density of 0.890 to 0.920 g/cm$^3$ and an intermediate layer comprising the olefin resin composition according to claim 4.

9. A laminated sheet comprising a surface layer comprising an olefin resin composite material, said olefin resin composite material comprising 100 parts by weight of an olefin resin material having a melt flow rate of 0.3 to 20 g/10 min and a density of 0.890 to 0.920 g/cm$^3$ and 200 parts by weight or less of an inorganic filler, and an intermediate layer comprising the olefin resin composition according to claim 1.

10. A laminated sheet comprising a surface layer comprising an olefin resin composite material said olefin resin composite material comprising 100 parts by weight of an olefin resin material having a melt flow rate of 0.3 to 20 g/10 min and a density of 0.890 to 0.920 g/cm$^3$ and 200 parts by weight or less of an inorganic filler, and an intermediate layer comprising the olefin resin composition according to claim 4.

11. A laminated sheet according to claim 7, wherein a thickness ratio of the surface layer to the intermediate layer is 1 to 80:99 to 20.

12. The laminated sheet according to claim 11, which is a sheet for thermoforming.

13. A laminated sheet comprising a surface layer comprising the olefin resin composition according to claim 1, and an intermediate layer comprising the olefin resin composition according to claim 1.

* * * * *